(12) United States Patent
Singh et al.

(10) Patent No.: US 11,977,592 B2
(45) Date of Patent: May 7, 2024

(54) TARGETED CRAWLER TO DEVELOP AND/OR MAINTAIN A SEARCHABLE DATABASE OF MEDIA CONTENT ACROSS MULTIPLE CONTENT PROVIDERS

(71) Applicant: Caavo Inc, Milpitas, CA (US)

(72) Inventors: Amrit P. Singh, Bangalore (IN); Sravan K. Andavarapu, Jeypore (IN); Vinod K. Gopinath, Bangalore (IN); Ashish D. Aggarwal, Stevenson Ranch, CA (US)

(73) Assignee: Caavo Inc, Milpitas, CA (US)

( * ) Notice: Subject to any disclaimer, the term of this patent is extended or adjusted under 35 U.S.C. 154(b) by 0 days.

(21) Appl. No.: 17/840,883

(22) Filed: Jun. 15, 2022

(65) Prior Publication Data

US 2022/0309118 A1  Sep. 29, 2022

Related U.S. Application Data

(63) Continuation of application No. 15/857,205, filed on Dec. 28, 2017, now abandoned.

(30) Foreign Application Priority Data

Dec. 30, 2016 (IN) .............................. 201641044985

(51) Int. Cl.
*G06F 16/9535* (2019.01)
*G06F 16/74* (2019.01)
(Continued)

(52) U.S. Cl.
CPC .......... *G06F 16/9535* (2019.01); *G06F 16/74* (2019.01); *G06F 16/9038* (2019.01);
(Continued)

(58) Field of Classification Search
CPC .. G06F 16/9535; G06F 16/74; G06F 16/9038; H04N 21/2665; H04N 21/278; H04N 21/435
See application file for complete search history.

(56) References Cited

U.S. PATENT DOCUMENTS 9,749,552 B2   8/2017  Gopinath et al.
2008/0195664 A1   8/2008  Maharajh et al.
(Continued)

*Primary Examiner* — Hosain T Alam
*Assistant Examiner* — Chongsuh Park
(74) *Attorney, Agent, or Firm* — Sterne, Kessler, Goldstein & Fox P.L.L.C.

(57) ABSTRACT

A system is described that includes an electronic program guide (EPG) data receiver and a media content catalog enhancer. The EPG receiver is configured to receive EPG data from an EPG data provider. The media content catalog enhancer is configured to determine that an item of media content identified by the EPG data comprises new media content and, in response to determining that the item of media content identified by the EPG data comprises new media content, to cause a web crawler to crawl a source website associated with the new media content to obtain information about the new media content and to store the obtained information about the new media content in a database, the database comprising a catalog of media content that is searchable by an end user to identify and access content for playback via an end user device.

20 Claims, 8 Drawing Sheets

(51) Int. Cl.
  *G06F 16/9038* (2019.01)
  *H04N 21/2665* (2011.01)
  *H04N 21/278* (2011.01)
  *H04N 21/435* (2011.01)

(52) U.S. Cl.
  CPC ....... *H04N 21/2665* (2013.01); *H04N 21/278* (2013.01); *H04N 21/435* (2013.01)

(56) References Cited

U.S. PATENT DOCUMENTS

| | | |
|---|---|---|
| 2011/0125753 A1 | 5/2011 | Dow et al. |
| 2012/0240148 A1 | 9/2012 | Liu et al. |
| 2014/0049693 A1* | 2/2014 | Selim ................... H04N 17/04 348/570 |
| 2014/0053196 A1 | 2/2014 | Selim |
| 2014/0053202 A1* | 2/2014 | Selim ................ H04N 21/4821 725/44 |
| 2014/0280554 A1 | 9/2014 | Webb et al. |
| 2015/0347511 A1 | 12/2015 | Schmidt et al. |
| 2016/0328475 A1 | 11/2016 | Liao et al. |
| 2018/0189409 A1 | 7/2018 | Singh et al. |

\* cited by examiner

TARGETED CRAWLER TO DEVELOP AND/OR MAINTAIN A SEARCHABLE DATABASE OF MEDIA CONTENT ACROSS MULTIPLE CONTENT PROVIDERS

CROSS-REFERENCE TO RELATED APPLICATIONS

This application is a continuation of U.S. patent application Ser. No. 15/857,205, filed on Dec. 28, 2017, entitled "TARGETED CRAWLER TO DEVELOP AND/OR MAINTAIN A SEARCHABLE DATABASE OF MEDIA CONTENT ACROSS MULTIPLE CONTENT PROVIDERS," which claims foreign priority to Indian Provisional Patent Application No. 201641044985, filed Dec. 30, 2016, entitled "Enhancing Search for Content Across a Wide Variety of Content Providers," the entireties of which are incorporated by reference herein.

BACKGROUND

Technical Field

The subject matter described herein relates to the development and/or maintenance of databases that facilitate searching for and accessing multimedia content.

Description of Related Art

Media content (e.g., movies, shows, music, etc.) is constantly growing and rapidly changing. As such, there is an influx of both the items of media content available for consumption by users and the content providers that provide the items of media content. Accordingly, it is difficult for user devices to obtain all this information, let alone keep it accurate and up to date. For instance, a user may want to watch an item of media content but is unable to quickly and accurately determine what content provider(s) are providing the item of media content and at what time the item of media content is available from the corresponding content provider(s).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for enabling targeted crawling to develop and maintain a searchable database of media content that is accessible by an end user device. A system in accordance with one embodiment includes an electronic program guide (EPG) data receiver and a media content catalog enhancer. The EPG receiver is configured to receive EPG data from an EPG data provider. The media content catalog enhancer is configured to determine that an item of media content identified by the EPG data comprises new media content and, in response to determining that the item of media content identified by the EPG data comprises new media content, to cause a web crawler to crawl a source website associated with the new media content to obtain information about the new media content, and to store the obtained information about the new media content in a database. In further accordance with this embodiment, the database may comprise a catalog of media content that is searchable by an end user to identify and access content for playback via an end user device.

A system in accordance with a further embodiment includes a media content identifier and a media content catalog enhancer. The media content identifier is configured to cause a web crawler to crawl one or more trending websites, rating websites, or informational websites to identify an item of media content. The media content catalog enhancer is configured to determine that the item of media content identified by the media content identifier comprises new media content and, in response to determining that the item of media content identified by the media content identifier comprises new media content, to cause a web crawler to crawl a source website associated with the new media content to obtain information about the new media content, and to store the obtained information about the new media content in a database. In further accordance with this embodiment, the database may comprise a catalog of media content that is searchable by an end user to identify and access content for playback via an end user device.

Further features and advantages, as well as the structure and operation of various examples, are described in detail below with reference to the accompanying drawings. It is noted that the ideas and techniques are not limited to the specific examples described herein. Such examples are presented herein for illustrative purposes only. Additional examples will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
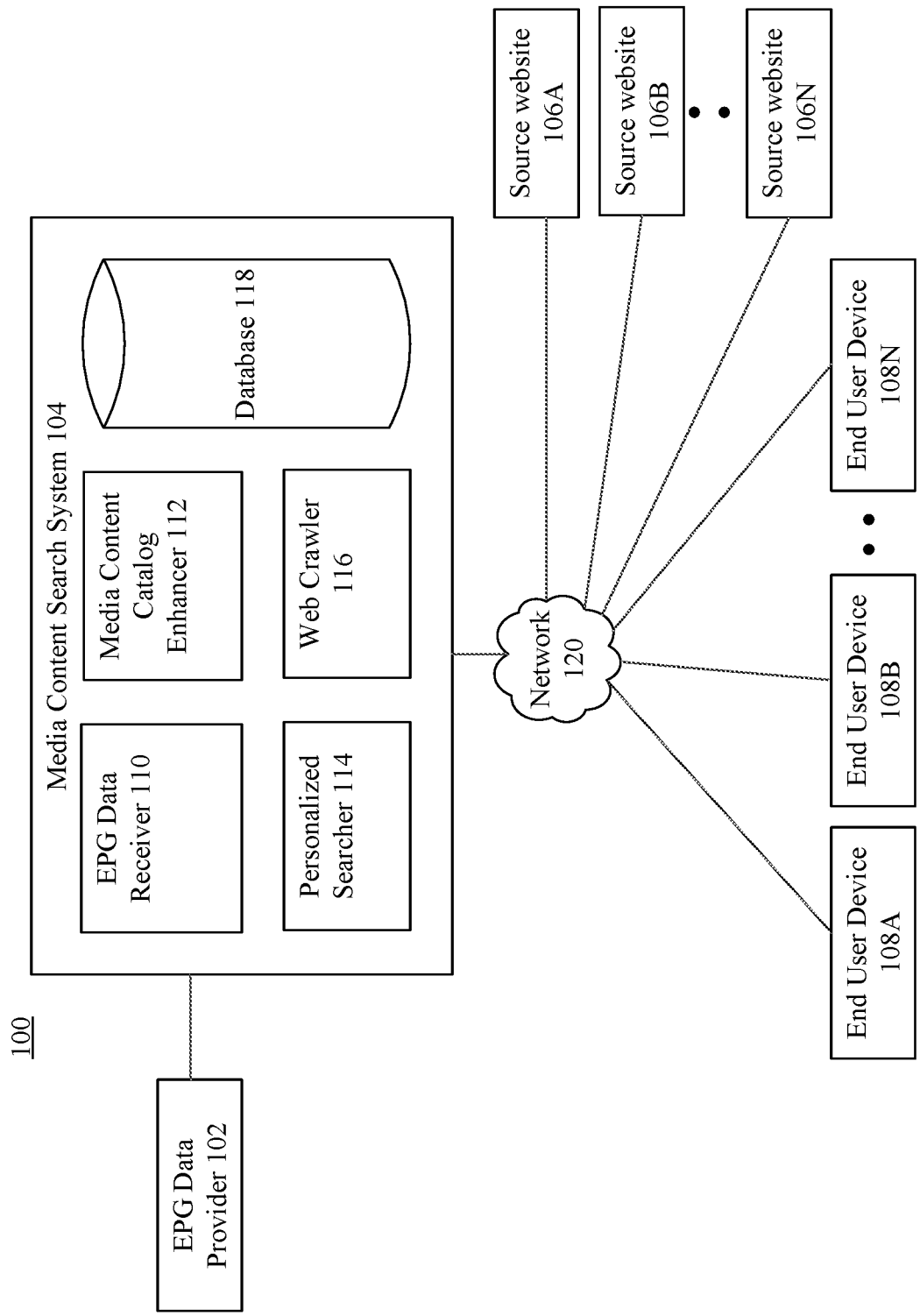
FIG. 1 is a block diagram of an example system for performing a targeted crawl to develop and/or maintain a searchable database of media content that is accessible by an end user device, in accordance with an embodiment.

The present specification discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

II. Example Embodiments

The example embodiments described herein are provided for illustrative purposes, and are not limiting. The examples described herein may be adapted to any type of targeted crawling system. Further structural and operational embodiments, including modifications/alterations, will become apparent to persons skilled in the relevant art(s) from the teachings herein.

As noted in the Background Section, above, media content is constantly growing and rapidly changing. For instance, catalogs of content providers, such as Hulu®, Netflix® and Amazon®, often change on a daily and hourly basis. Furthermore, the number of content providers is an ever-growing list. As such, it is difficult to keep track of what items of media content are available, where the items of media content are available, and at what time the items of media content are available. Moreover, while certain items of media content may be present at multiple content providers, the information/metadata specific to the item of media content at each content provider differs, making it difficult to catalog or organize the information in a database or even determine that the content providers contain the same item of media content.

Embodiments herein are directed to efficiently developing and maintaining a searchable database of media content across multiple content providers by enabling targeted crawling of source websites. In embodiments, a media content search system first identifies items of media content. An item of media content is any information or experience directed towards an end user or audience and may include, for example, digital movies, programs, music or the like that can be downloaded or streamed to an end user device for playback to an end user. The items of media content may be available from one or more source websites, discussed in detail hereinafter, and the items of media content may be identified in various ways.

In an embodiment, the media content search system identifies items of media content based on electronic program guide (EPG) data. For instance, an EPG data receiver of the media content search system may receive EPG data from an EPG data provider (e.g., DirectTV®, AT&T®, Comcast®, etc.), wherein the EPG data identifies items of media content that are scheduled to air along with their corresponding availability times. Such EPG data may be made available by the EPG data provider some period of time (e.g., 15 days) ahead of when the programs identified therein are scheduled to air.

In an alternative embodiment, a media content identifier of the media content search system identifies items of media content by crawling certain websites. For instance, the media content search system may crawl certain trending websites, rating websites, and/or informational websites to identify items of media content. Trending websites (e.g., Twitter®, Facebook®, Instagram®, etc.) may comprise online news and social networking services where users post and interact through messages and pictures. Trending websites may provide information about what shows and events are popular, both currently and in the future. For instance, a trending website may provide information about what shows are being watched by specific demographics, or what shows and events users are excited about. Rating websites (e.g., Rotten Tomatoes®, etc.) may comprise review aggregation websites for media content where users rate media content, for instance, via a rating system and/or reviews. Rating websites may provide current and historic data about what media content is popular and unpopular. For instance, a rating website may provide information about what movies were extremely popular and therefore will likely be searched for by users. Informational websites (e.g., IMDB®) may comprise online databases of information related to media content. Informational websites may provide detailed information about media content, such as shows, movies, actors, release dates, etc. For instance, an informational website may provide information about what movies are going to be released that star a popular actor. As such, it may be determined that the movie will likely be popular.

Once the media content search system identifies items of media content, the media content search system then determines if an item of media content comprises new media content. In embodiments, this determination is performed by a media content catalog enhancer of the media content search system. In an embodiment, the media content search system may compare information about the item of media content to information about media content already stored in the database to determine if the item of media content comprises new media content. Alternatively, the media content search system may rely on received EPG data to determine if items of media content comprise new media content. For instance, the received EPG data may alert the media content search system that the item of media content is being aired for the first time and thus, the media content search system may determine that the item of media content comprises new media content. Furthermore, the media content search system may rely both on the received EPG data and what is already present in the database to determine if items of media content comprise new media content. For instance, the media content search system may determine that an item of media content is new media content if the item of media content is being aired for the first time as specified by the received EPG data and there is no information about the item of media content in the database. Still further, the media content search system may rely on information obtained by crawling particular websites to determine if items of media content comprise new media content. For instance, an informational website may include a release date for an item of media content and the media content search system may determine that the item of media content comprises new media content based on the release date.

Once the media content search system determines that certain items of media content comprise new media content, the media search system obtains information about the new items of media content such that the information can be stored in the database. Such information may include a content identifier (ID) as well as other information useful or necessary to access the item of media content from a source website for playback on an end user device. In an embodiment, the media content search system causes a web crawler to crawl a source website associated with the new media content to obtain information about the new media content. The web crawler may comprise a web spider, Internet bot, or other automated entity that is capable of browsing a source website to obtain information about items of media content.

A source website may comprise a website of a content provider for one or more items of media content. A content provider may be any provider of media content such as an over-the-top (OTT) media services provider (e.g., Hulu®, Netflix®, HBO®, Youtube®, Amazon®, etc.) or an online digital media store (e.g., Itunes®, etc.). Once the web crawler crawls the source website(s), the web crawler may obtain a content ID and/or other information that corresponds to the item of media content at the corresponding source website. In an embodiment, the web crawler is scheduled to crawl the source website at or around a time that the new media content becomes available (or at some other time related to the time the new media content becomes available) as specified by the EPG data or by other information obtained by the media content search system.

Once the web crawler obtains information about the new media content, the web crawler provides the information about the new media content so that it may be stored in a database in the media content search system. For instance, the database may store the obtained content ID for the item of new media content. As such, if an end user of an end user device wants to play the item of new media content corresponding to the content ID at a particular content provider, the end user device can obtain and pass the unique ID to an appropriate service which can then easily and efficiently retrieve the item of media content.

The database described herein may be searchable by an end user via an end user device to identify items of media content of interest to the end user and to access such items of media content for playback on an end user device (or via a device that is connected to the end user device). The database may be populated by obtaining information about items of media content from various sources. For example, information about items of media content may be retrieved from content providers, such as, entertainment content metadata provider(s) (e.g., Gracenote®, Rovi®, etc.), video content provider(s) (e.g., Hulu®, Netflix®, HBO®, Youtube®, Amazon®, etc.), web-based information provider(s) (e.g., IMDB®), and audio content provider(s) (e.g., Rhapshody®, Itunes®, Last.fm®, etc.). Information about items of media content may also be obtained from recorded content (e.g., content stored on DVR that is connected to the end user device), and/or network-based content (e.g., content that is stored in a local area network to which the end user device is connected). In this way, the database may be populated with information relating to popular and/or new media content such that when the end user of the end user device performs a search on the media content search system, the system displays to the end user information about items of media content that are popular and/or new and can be easily played using the content ID from the database.

For instance, in an embodiment, an end user may perform a search for content within the database of the media content search system. The end user may submit a search query to the media content search system and the media content search system may apply the search query to the database to identify items of media content that are responsive to the query. For instance, the end user may enter a search query for a particular genre or type of media content. As such, the media content search system will identify items of media content in the database that are related to the particular genre or type identified in the search query. However, the database may contain information relating to items of media content made available by different content providers and, therefore, not every end user may have an account, subscription or license necessary to access an item of media content. Accordingly, in an embodiment, the media content search system filters the items of media content that are responsive to the query such that the end user is provided with only the items of media content that the end user has a right to access. Alternatively, or additionally, the media content search system may rank the items of media content that are responsive to the query such that the end user is provided first with the items of media content that she has a right to access and second with the remaining items of media content that may be available to the end user only if she subscribes to a service, creates an account, pays for the content, or the like. The items of media content that are responsive to the query may also be filtered or ranked in other ways.

For example, the items of media content that are responsive to the query may be filtered or ranked based on one or more of the following: whether the end user possesses a subscription to a service associated with each item of media content that is responsive to the query; a measure of popularity of each item of media content that is responsive to the query; whether each item of media content that is responsive to the query is currently available on live television; a user preference associated with one or more of the items of media content that are responsive to the query; whether each item of media content is related to a recently-watched item of media content; whether each item of media content is determined to be of interest to one or more other end users that are related to the end user. Once the items of media content that are responsive to the query are filtered or ranked, the information about the filtered or ranked items of media content are provided to the end user device for presentation to the end user.

Embodiments described herein address technical problems associated with building and maintaining a database of information about items of media content that are available across multiple content providers. For example, by limiting the crawling of content provider websites such that the crawling is focused only on new content and/or such that the crawling only occurs at or around the time such new content becomes available, embodiments described herein can reduce the amount of resources (e.g., processing power, network bandwidth and the like) necessary to obtain the desired media content information and thereby improve the functioning of the computing devices upon which the described system is implemented. Furthermore, by obtaining information from a content provider about the new content the moment it becomes available (or shortly thereafter), the new content can be made quickly accessible to a user of the system with little or no delay. Still further, by limiting the extent to which the content provider websites must be accessed, embodiments described herein can avoid being denied access to such websites, since some websites may deny access to entities that are deemed to be making too many access requests over a given time period.

Example embodiments are described as follows that are directed to performing a targeted crawl to develop and/or maintain a searchable database of media content that is accessible by an end user device. For instance, FIG. 1 is a block diagram of an example system 100 for performing a targeted crawl to develop and/or maintain a searchable database of media content that is accessible by an end user device, in accordance with an embodiment. As shown in FIG. 1, system 100 includes an EPG data provider 102, a media content search system 104, a plurality of end user devices 108A-108N, and a plurality of source websites 106A-106N. It should be noted that there can be any number of end user devices and/or source websites present in system 100. End user devices 108A-108N, source websites 106A-106N, and media content search system 104 are all communicatively coupled via network 120. Network 120 may comprise one or more networks such as local area networks (LANs), wide area networks (WANs), enterprise networks, the Internet, etc., and may include one or more of wired and/or wireless communication links. EPG data provider 102 is further coupled to media content search system 104. Such coupling between components may be wired, wireless, or a combination thereof and may be, for example, over network 120.

EPG data provider 102 is a system that provides data that is typically consumed by an EPG, which is an application that is used with digital set-top boxes and television sets to list current and scheduled programs that are or will be available on each channel and a short summary or commentary for each program. In embodiments, EPG data provider 102 may comprise a server or other entity that is accessed by EPG data receiver 110 via a network (e.g., the Internet) or some other communication channel. EPG data provider 102 may be configured to provide periodically-updated or intermittently-updated EPG data. The EPG data may be published by a variety of different media broadcasting entities, such as DirectTV®, AT&T®, Comcast®, or the like, although these examples are not intended to be limiting.

End user devices 108A-108N are intended to represent devices that enable users to interact with media content search system 104 and may include handheld devices as well as stationary devices. Examples of handheld devices include television remote controls, universal remotes, smart phones, tablet devices, and other devices that can be held in a person's hand or hands. Examples of stationary devices include televisions, set-top boxes, satellite TV receiver boxes, DVD players, and other devices too large to be easily carried by a human, and that are intended to operate in a stationary location.

In an embodiment, one or more of end user devices 108A-108N comprise an HDMI switching device such as that described in commonly-owned U.S. patent application Ser. No. 14/945,125, filed Nov. 18, 2015, and entitled "Automatic Identification and Mapping of Consumer Electronic Devices to Ports on an HDMI Switch", the entirety of which is incorporated by reference herein. In accordance with such an embodiment, the HDMI switching device is connected to a television or other display device and provides a user interface through such display device by which a user can search for items of media content. Search queries submitted by the end user are passed by the HDMI switching device to media content search system 104 and information about items of media content that are responsive to the search query are passed back to the HDMI switching device for display via the connected display device. If the end user selects one of the items of media content, the HDMI switching device can utilize a content ID and/or other information provided by or otherwise accessible to media content search system 104 to access the media content for playback to the end user via the connected display device.

End users of end user devices 108A-108N are enabled to search for information about media content that is stored by media content search system 104. Such media content information may be retrieved from one or more content providers such as entertainment content metadata provider(s) (e.g., Gracenote®, Rovi®, etc.), video content provider(s) (e.g., Hulu®, Netflix®, HBO®, Youtube®, Amazon®, etc.), web-based information provider(s) (e.g, IMDB®), and audio content provider(s) (e.g., Rhapshody®, Itunes®, Last.fm®, etc.). Such media content information may be obtained from a DVR or other recording device that stores recorded media content and is connected to one of end user devices 108A-108N. Such media content information may also be obtained from a device that is connected to one of end user devices 108A-108N via a LAN or other local connection. Each of end user devices 108A-108N may be interacted with by an end user to provide commands, queries, etc., in various ways, such as by a text input, a voice command, etc.

To obtain information about items of media content from external content providers, as will be discussed in detail hereinafter, media content search system 104 crawls certain source websites via network 120. For instance, source websites 106A-106N are websites that are published by providers of media content (e.g., Netflix®, Hulu®, Amazon®, HBOGO®, etc.) and that provide a means for accessing digital media content thereon.

As shown in FIG. 1, media content search system 104 includes an EPG data receiver 110, a media content catalog enhancer 112, a personalized searcher 114, a web crawler 116, and a database 118. One or more of these components of media content search system 104 may be implemented on the same device. Alternatively, each of these components of media content search system 104 may be implemented on its own device. Furthermore, each of these components of media content search system 104 may be implemented in hardware (e.g., as digital and/or analog circuits), as software (e.g., as computer programs executed by one or more processors), or as a combination of hardware and software. EPG data receiver 110 is configured to receive EPG data from EPG data provider 102. As noted above, the EPG data may specify or identify items of media content and corresponding information (e.g., air times, channels, etc.). EPG data receiver 110 may be configured to obtain EPG data from EPG data provider 102 on a continuous, periodic or intermittent basis.

Media content catalog enhancer 112 is configured to identify new items of media content and to obtain information about such new items of media content for storage in database 118. In an embodiment, media content catalog enhancer 112 is configured to determine if an item of media content identified by the EPG data received by EPG data receiver 110 comprises new media content and in response to determining that the item of media content identified by the EPG data comprises new media content, to cause web crawler 116 to crawl a source website associated with the new media content to obtain information about the new media content. For instance, the source website may be one of source websites 106A-106N.

Media content catalog enhancer 112 is further configured to store obtained information about new media content in database 118. Database 118 is stored in one or more suitable memory devices. Database 118 is configured to store obtained information relating to new media content. In an embodiment, database 118 stores a content ID for each item of media content that can be used to access such item of media content from a content provider website or service for playback. Thus, for example, when an end user of an end user device 108A-108N wishes to watch an item of media content, the content ID can be retrieved from database 118 and passed to the content provider website or service to quickly retrieve the content. In the embodiment shown in FIG. 1, database 118 is configured to maintain information relating to items of media content wherein such information is retrieved from various sources, including source websites 106A-106N.

Personalized searcher 114 is configured to enable users of end user devices 108A-108N to perform a targeted search for content within database 118. For instance, personalized searcher 114 is configured to receive a search query from a user of one of end user devices 108A-108N. Accordingly, personalized searcher 114 may apply the search query to database 118 to identify items of media content that are responsive to the search query. As noted above, the identified items of media content may contain information relating to items of media content that the user is unable to access. As such, personalized searcher 114 is further configured to filter and/or rank the items of media content based on what items of media content the end user has a right to access. The items of media content may be filtered and/or ranked in various ways, discussed in detail hereinafter. Once the items of media content are filtered and/or ranked, personalized searcher 114 is further configured to provide information about the filtered or ranked items of media content to the end user device 108A-108N for presentation to the end user. In the embodiment shown in FIG. 1, personalized searcher 114 is configured to enable end users of end user devices to perform targeted searches for content within database 118, including end users of end user devices 108A-108N.

Figure 2:
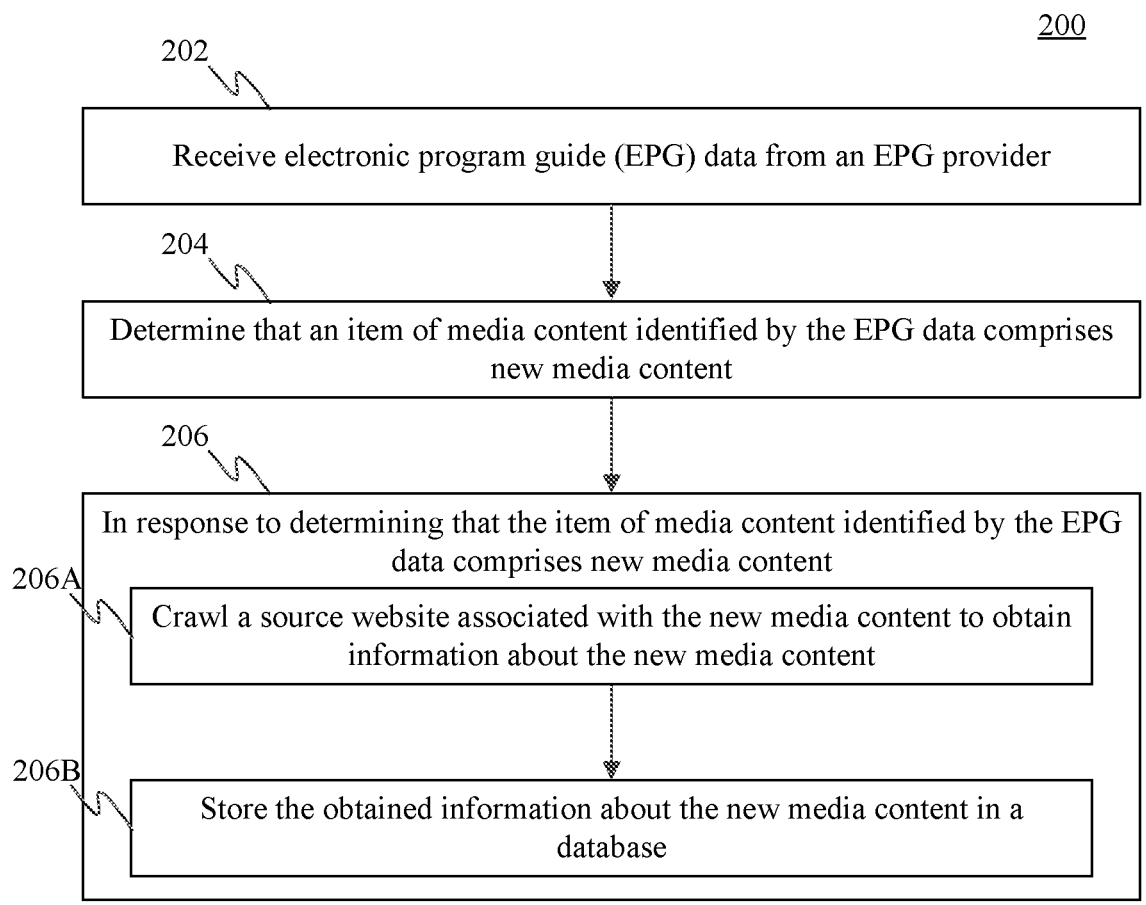
FIG. 2 shows a flowchart of a method for performing a targeted crawl to develop and/or maintain a searchable database of media content that is accessible by an end user device, in accordance with an embodiment.

The operation of system 100 will now be further described as follows with respect to FIG. 2. In particular, FIG. 2 shows a flowchart 200 of a method for performing a targeted crawl to develop and/or maintain a searchable database of media content that is accessible by an end user device, in accordance with an embodiment. In an embodiment, system 100 of FIG. 1 may operate according to flowchart 200. Further structural and operational embodiments will be apparent to persons skilled in the relevant art(s) based on the discussion regarding flowchart 200. Flowchart 200 is described as follows.

Flowchart 200 begins with step 202. In step 202, EPG data is received from an EPG provider. For example, and with reference to FIG. 1, EPG data receiver 110 receives EPG data from EPG data provider 102. The EPG data may identify items of media content and include additional information about the media content (e.g., air times, channels, etc.). For example, the EPG data may identify an item of media content as "Game of Thrones Season 8, Episode 1" and also specify that the item of media content is scheduled to become available on content provider "HBO" at 9 P.M. EST on a particular future date.

In step 204, it is determined that an item of media content identified by the EPG data comprises new media content. For example, and with reference to FIG. 1, media content catalog enhancer 112 determines if an item of media content identified by the EPG data comprises new media content. For example, in accordance with step 204, media content catalog enhancer 112 determines if "Game of Thrones Season 8, Episode 1" comprises new media content. As noted above, and as discussed in detail hereinafter, media content catalog enhancer 112 may make this determination in a variety of ways.

In step 206, steps 206A, and 206B are performed for each item of media content identified by the EPG data that is determined to include new media content. For example, if it is determined that "Game of Thrones Season 8, Episode 1" includes new media content, steps 206A and 206B will be performed for that item of media content.

At step 206A, a source website associated with the new media content is crawled to obtain information about the new media content. For example, and with continued reference to FIG. 1, web crawler 116 crawls one of source websites 106A-106N that is associated with the new media content to obtain information about the new media content. This information may include, for example, a content ID that identifies the new media content and enables the new media content to be accessed at the corresponding source website or using a corresponding web service. For example, if source website 106A is an "HBO®" website, then web crawler 116 will crawl source website 106A to obtain a content ID relating to "Game of Thrones Season 8, Episode 1." This content ID will be specific to "HBO®" such that a when the content ID is passed to the "HBO®" website or service, that "HBO®" website or service will access "Game of Thrones Season 8, Episode 1" as the desired content.

At step 206B, the obtained information about the new media content is stored in a database. For example, and with continued reference to FIG. 1, the information obtained by web crawler 116 is stored in database 118. For example, the content ID relating to "Game of Thrones Season 8, Episode 1" will be stored in database 118 (as well as various other items of information that may be obtained via the aforementioned web crawling).

Figure 3:
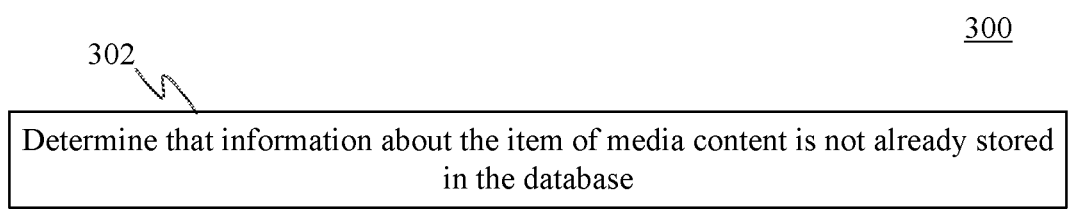
FIG. 3 shows a flowchart of a method for determining that an item of media content comprises new media content, in accordance with an embodiment.

Flowcharts of various methods that may be performed by system 100 or as part of the method of flowchart 200 will now be described. For instance, FIG. 3 shows a flowchart 300 of a method for determining that an item of media content comprises new media content, in accordance with an embodiment. Flowchart 300 may be implemented by media content catalog enhancer 112 of FIG. 1. Flowchart 300 is described as follows. Other structural and operational embodiments will be apparent to persons skilled in the relevant art(s) based on the following discussion regarding flowchart 300.

Flowchart 300 begins with step 302. In step 302, it is determined that information about the item of media content is not already stored in the database. For example, and with continued reference to FIG. 1, media content catalog enhancer 112 may determine that information about the item of new media content identified by the EPG data is not already stored in database 118. For example, media content catalog enhancer 112 may determine that information about "Game of Thrones Season 8, Episode 1" is not already stored in database 118 and in response to determining that information about "Game of Thrones Season 8, Episode 1" is not already stored in database 118, determine that "Game of Thrones Season 8, Episode 1" comprises new media content.

Figure 4:
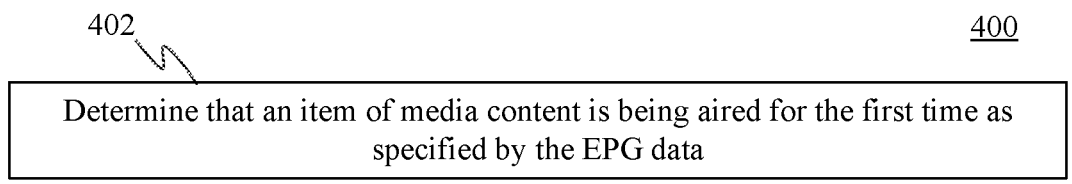
FIG. 4 shows another flowchart of a method for determining that an item of media content comprises new media content, in accordance with an embodiment.

Alternatively, the item of media content may be determined to comprise new media content based on the received EPG data. For instance, FIG. 4 shows another flowchart 400 of a method for determining that an item of media content comprises new media content, in accordance with an embodiment. Flowchart 400 may be implemented by media content catalog enhancer 112 of FIG. 1. Flowchart 400 is described as follows. Other structural and operational embodiments will be apparent to persons skilled in the relevant art(s) based on the following discussion regarding flowchart 400.

Flowchart 400 begins with step 402. In step 402, it is determined that an item of media content is being aired for the first time as specified by the EPG data. For example, and with reference to FIG. 1, media content catalog enhancer 112 may receive EPG data that includes for an item of media content: a title, an air time, a channel, and an indication that the title is being aired for the first time. Since the EPG data includes an indication that the title is being aired for the first time, media content catalog enhancer 112 determines that the item of media content comprises new media content. For example, if the received EPG data includes "Game of Thrones Season 8, Episode 1", "HBO®", "9 P.M. EST" on some future date, and an indication that the title is being aired for the first time, media content catalog enhancer 112 will determine that "Game of Thrones Season 8, Episode 1" comprises new media content.

Figure 5:
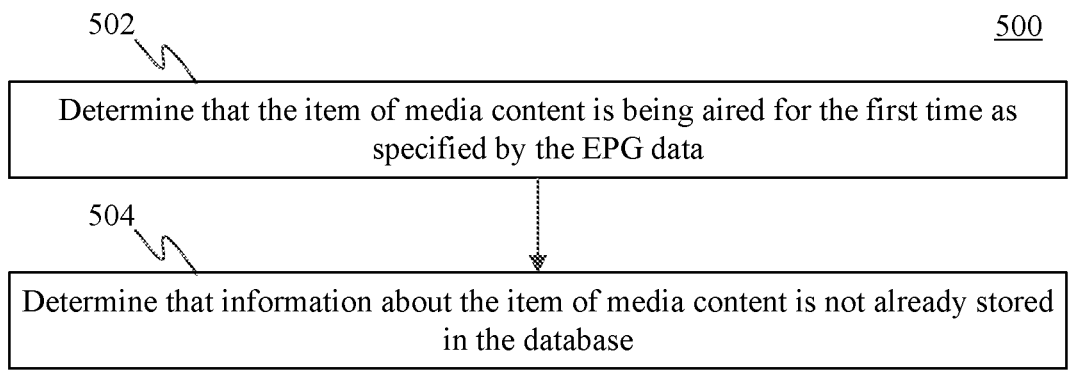
FIG. 5 shows another flowchart of a method for determining that an item of media content comprises new media content, in accordance with an embodiment.

Furthermore, the item of media content identified by the EPG data may be determined to comprise new media content based on both the received EPG data and whether or not information about the item of media content is already present in the database. For instance, FIG. 5 shows another flowchart 500 of a method for determining that an item of media content comprises new media content, in accordance with an embodiment. Flowchart 500 may be implemented by media content catalog enhancer 112 of FIG. 1. Flowchart 500 is described as follows. Other structural and operational embodiments will be apparent to persons skilled in the relevant art(s) based on the following discussion regarding flowchart 500.

Flowchart 500 begins with step 502. In step 502, it is determined that an item of media content is being aired for the first time as specified by the EPG data. For example, and with continued reference to FIG. 1, media content catalog enhancer 112 may receive EPG data that includes for an item of media content: a title, an air time, a channel, and an indication that the title is being aired for the first time. Since the EPG data includes an indication that the title is being aired for the first time, media content catalog enhancer 112 determines that the item of media content is potentially new media content. For example, if the received EPG data includes "Game of Thrones Season 8, Episode 1", HBO®, 9 P.M. EST on some future date, and an indication that the title is being aired for the first time, media content catalog enhancer 112 determines that "Game of Thrones Season 8, Episode 1" is potentially new media content.

In step 504, in response to determining that the item of media content is potentially new media content, it is determined that information about the item of media content is not already stored in the database. For example, and with continued reference to FIG. 1, media content catalog enhancer 112 may determine that information about the item of media content identified by the EPG data is not already stored in database 118. For example, media content catalog enhancer 112 may determine that information about "Game of Thrones Season 8, Episode 1" is not already stored in database 118 and in response to determining that information about "Game of Thrones Season 8, Episode 1" is not already stored in database 118, determine that "Game of Thrones Season 8, Episode 1" comprises new media content.

Figure 6:
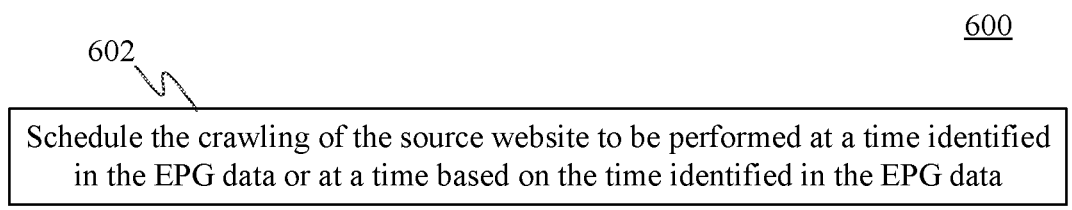
FIG. 6 shows a flowchart of a method for scheduling a targeted crawl of a source website, in accordance with an embodiment.

As noted above, in response to an item of media content being determined to comprise new media content, an associated source website may be crawled to retrieve information about the new media content. In an embodiment, if received EPG data specifies that the content is to become available at some later time, then the crawling of the source website may be scheduled for such later time, or for some predetermined time before or after the later time. For instance, FIG. 6 shows a flowchart 600 of a method for scheduling a targeted crawl of a source website, in accordance with an embodiment. Flowchart 600 may be implemented by media content catalog enhancer 112 of FIG. 1. Flowchart 600 is described as follows. Other structural and operational embodiments will be apparent to persons skilled in the relevant art(s) based on the following discussion regarding flowchart 600.

Flowchart 600 begins with step 602. In step 602, the crawling of the source website is scheduled to be performed at a time identified in the EPG data or based on the time identified in the EPG data. For example, and with continued reference to FIG. 1, media content catalog enhancer 112 may schedule web crawler 116 to crawl the source website associated with the new media content at a time identified in the EPG data or at a time based on the time identified in the EPG data. For example, if the EPG data specifies that "Game of Thrones Season 8, Episode 1" will be available on source website 106A (i.e., "HBO®") in three days at 9 P.M. EST, media content catalog enhancer 112 may schedule web crawler 116 to crawl source website 106A in three days at 9 P.M. EST (or at some time before or after this time, such as 1 hour before or after this time). This approach provides advantages including that web crawler 116 does not need to continuously crawl source website 106A to find the desired information which could result in source website 106A blocking web crawler 116. This also enables information will be retrieved related to "Game of Thrones Season 8, Episode 1" at the time that it becomes available so there will be little or no delay.

Figure 7:
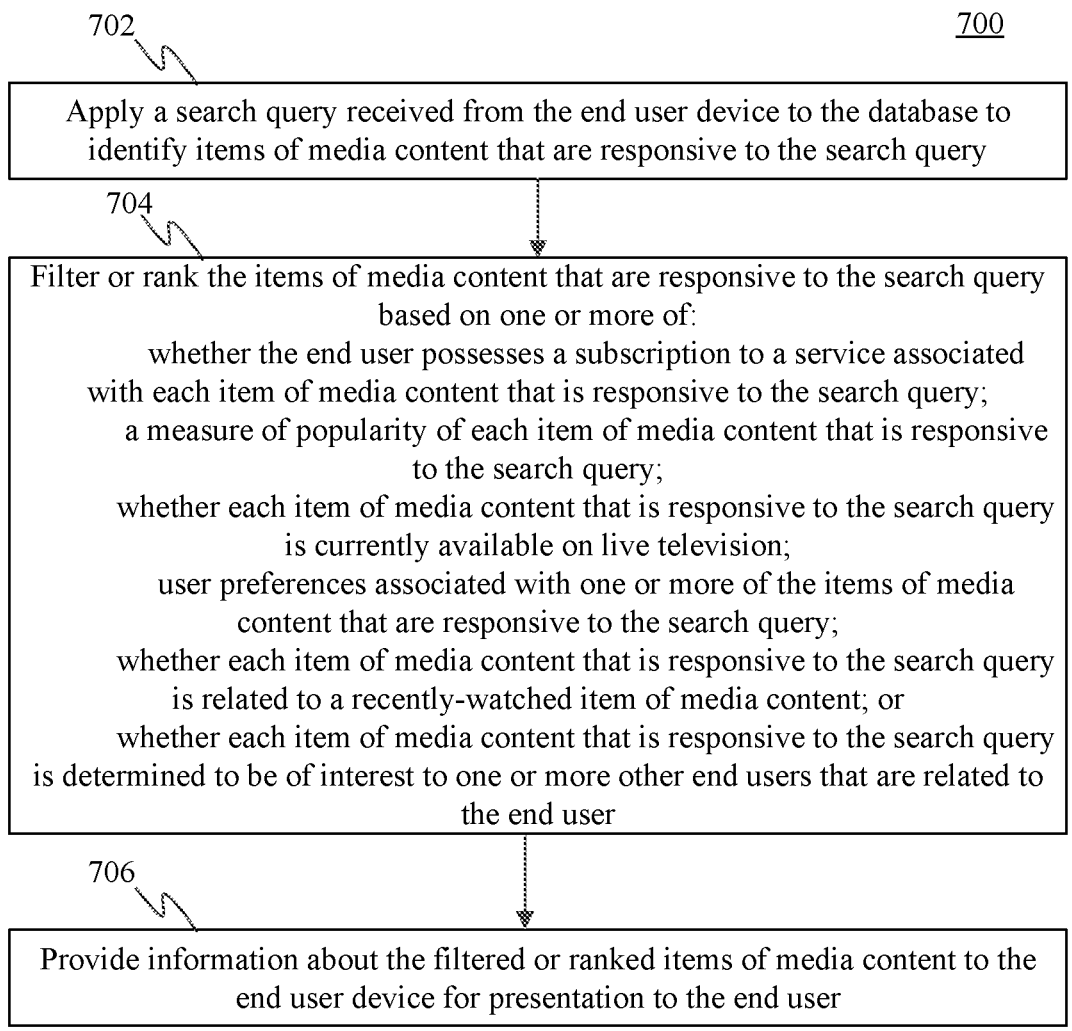
FIG. 7 shows a flowchart of a method for searching a database for media content that is accessible by an end user device, in accordance with an embodiment.

As noted above, a user may search for an item of media content. For instance, FIG. 7 shows a flowchart 700 of a method for searching a database for media content that is accessible by a user device, in accordance with an embodiment. Flowchart 700 may be implemented by personalized searcher 114 of FIG. 1. Flowchart 700 is described as follows. Other structural and operational embodiments will be apparent to persons skilled in the relevant art(s) based on the following discussion regarding flowchart 700.

Flowchart 700 begins with step 702. In step 702, a search query received from the end user device is applied to the database to identify items of media content that are responsive to the query. For instance, and with reference to FIG. 1, a user of one of end user devices 108A-108N inputs a search query that is received by personalized searcher 114. In an embodiment, the search query includes a request to identify items of media content related to the search query. For instance, a user of end user device 108A may input a search query to see "Action Movies" that is received by personalized searcher 114. In an embodiment, personalized searcher 114 identifies items of media content about which information is stored in database 118 that are related to the search query. For example, and in response to the search query of the user of end user device 108A, personalized searcher 114 identifies items of media content about which information is present in database 118 that are related to the search query. For instance, personalized searcher 114 identifies movies about which information is stored in database 118 that are categorized as being in the action genre.

In step 704, the items of media content that are responsive to the search query are filtered or ranked based on one or more of: whether the end user possesses a subscription to a service associated with each item of media content that is responsive to the query; a measure of popularity of each item of media content that is responsive to the query; whether each item of media content that is responsive to the query is currently available on live television; user preferences associated with one or more of the items of media content that are responsive to the query; whether each item of media content is related to a recently-watched item of media content; or whether each item of media content is determined to be of interest to one or more other end users that are related to the end user.

For instance, in an embodiment, personalized searcher 114 filters or ranks the items of media content that are responsive to the search query based on whether the end user possesses a subscription to a service associated with each item of media content that is responsive to the search query. For instance, assume the user of end user device 108A only has subscriptions to Netflix® and HBOGO®. Then, when personalized searcher 114 returns information about movies in the action genre that are available on Netflix®, HBOGO®, and Amazon®, the movies provided by Amazon® should be filtered out or ranked below those provided by Netflix® and HBOGO®. As such, personalized searcher 114 will filter out the movies provided by Amazon® and only provide information about the movies provided by Netflix® and HBOGO® to the user. Alternatively, or additionally, personalized searcher 114 may rank the movies provided by Netflix® and HBOGO® first, and then the movies provided by Amazon® second. The filtering or ranking may be performed by personalized searcher 114 in various ways.

In another embodiment, personalized searcher 114 filters or ranks the items of media content based on a measure of popularity of each item of media content that is responsive to the query. In another embodiment, personalized searcher 114 filters or ranks the items of media content based on whether each item of media content that is responsive to the query is currently available on live television. In another embodiment, personalized searcher 114 filters or ranks the items of media content based on user preferences associated with one or more of the items of media content that are responsive to the query. In another embodiment, personalized searcher 114 filters or ranks the items of media content based on whether each item of media content is related to a recently-watched item of media content. In another embodiment, personalized searcher 114 filters or ranks the items of media content based on whether each item of media content is determined to be of interest to one or more other end users that are related to the end user. Personalized searcher 114 may use any of the above-described techniques to filter or rank the responsive items of media content alone or in any combination. Personalized searcher 114 may further use other or additional methods for filtering or ranking the responsive items of media content.

In step 706, information about the filtered or ranked items of media content are provided to the end user device for presentation to the end user. For instance, and with continued reference to FIG. 1, information about the filtered or ranked items of media content may be provided to any one of end user devices 108A-108N that transmitted the search query. In embodiments, the filtered or ranked items of media content are displayed to a user of end user device 108A via a display. The display may be, in embodiments, present on end user device 108A, or a display device connected thereto. For example, with continued reference to a particular example set forth above, information about the relevant movies available on Netflix® and HBOGO® (and optionally, the additional movies available on Amazon®) may be displayed to the end user via a display device that is connected to end user device 108A.

Furthermore, and as noted above, the end user of the corresponding end user device may select an item of media content from the displayed list to play the selected item of media content. If the user chooses an item of media content, the end user device and/or media content search system 104 passes the corresponding content ID of the item of media content to the appropriate content provider website or service to obtain and play the item of media content. For instance, the user of end user device 108A may select a movie available on Netflix®. End user device 108A and/or media content search system 104 will pass the content ID corresponding to the selected movie to the Netflix® website or service, which the Netflix® website or service recognizes as the selected movie. As such, the movie will be quickly obtained for playback to the end user.

Figure 8:
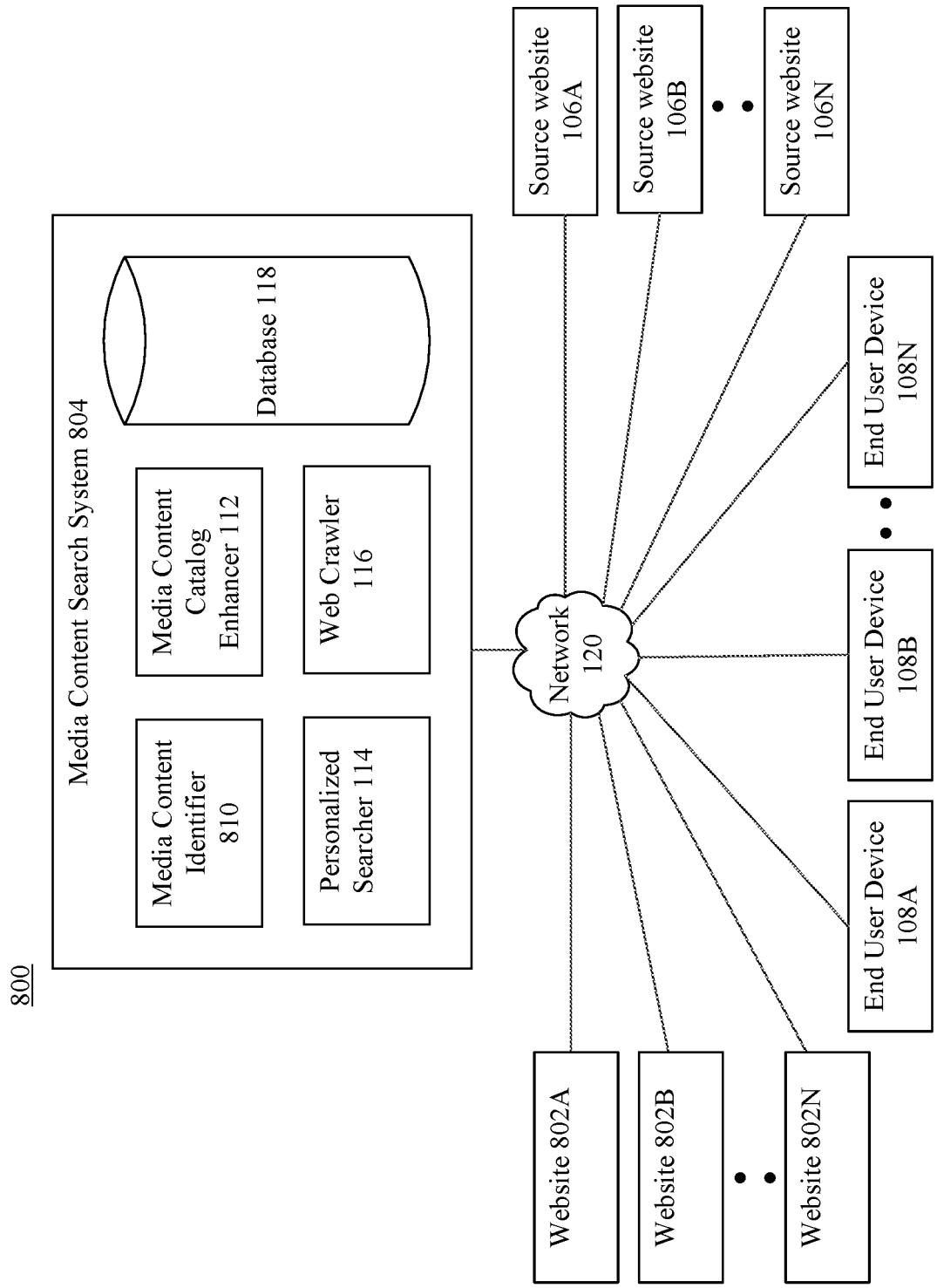
FIG. 8 shows a block diagram of another example system for performing a targeted crawl to develop and/or maintain a searchable database of media content that is accessible by an end user device, in accordance with an embodiment.

In an alternative embodiment, instead of or in addition to using EPG data to identify new media content as described above, a media content search system crawls certain websites to identify new media content. For instance, FIG. 8 shows a block diagram of another example system 800 for performing a targeted crawl to develop and/or maintain a searchable database of media content that is accessible by an end user device, in accordance with an embodiment. As shown in FIG. 8, system 800 includes websites 802A-802N, media content search system 804, source websites 106A-106N, and end user devices 108A-108N. Media content search system 804 is similar to media content search system 104 of FIG. 1, except that instead of EPG receiver 110, media content search system 804 includes a media content identifier 810 for identifying items of media content. As will be discussed below, media content identifier 810 identifies such items of media content by causing certain websites (namely, websites 802A-802N) to be crawled. Websites 802A-802N may be connected to and accessed by media content search system 804 via network 120. Each component of media content search system 804 may be implemented in hardware, software, or as a combination of software. Furthermore, one or more components of media content search system 804 may be executed on the same computing device or on their own computing device.

Figure 9:
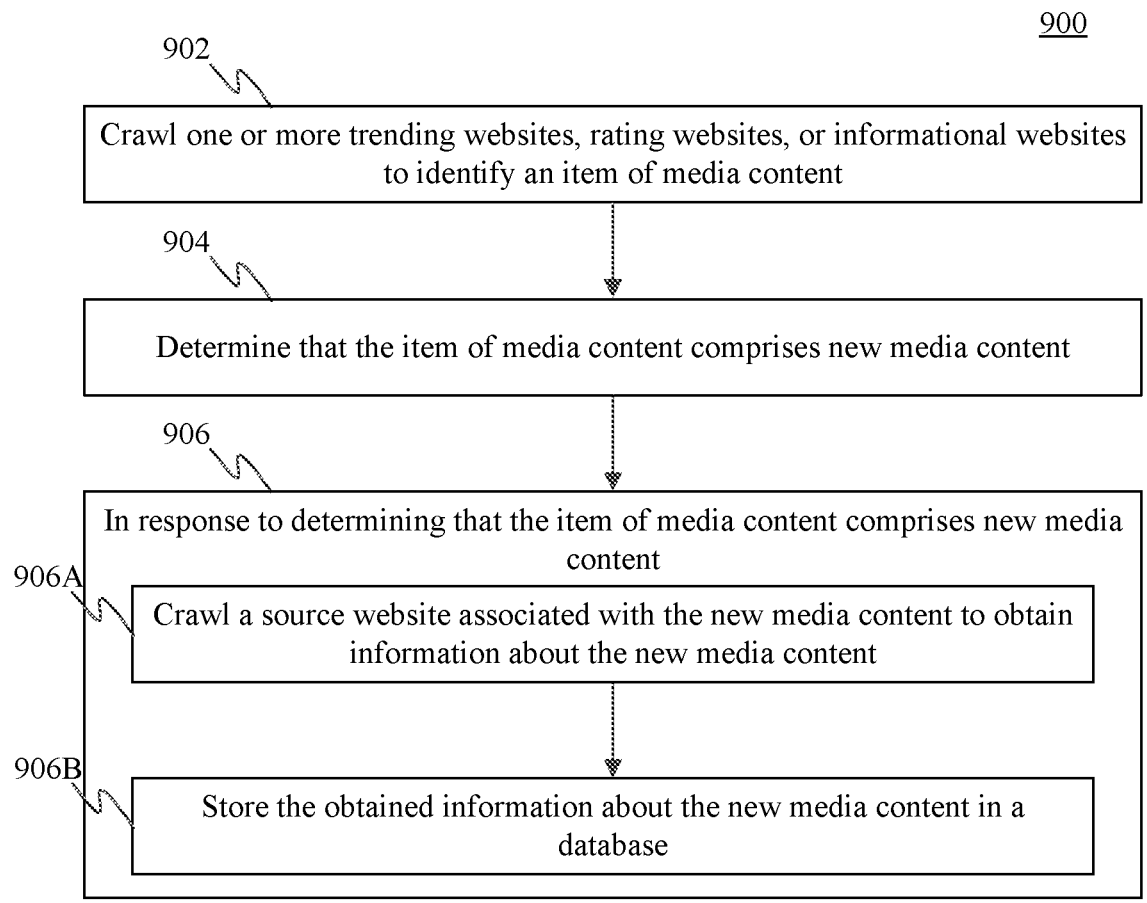
FIG. 9 shows a flowchart of another method for performing a targeted crawl to develop and/or maintain a searchable database of media content that is accessible by an end user device in accordance with an embodiment.

The operation of system 800 will now be further described in reference to FIG. 9. In particular, FIG. 9 shows a flowchart 900 of another method for performing a targeted crawl to develop and/or maintain a searchable database of media content that is accessible by an end user device, in accordance with an embodiment. Flowchart 900 may be implemented by media content search system 804 of FIG. 8. Flowchart 900 is described as follows. Other structural and operational embodiments will be apparent to persons skilled in the relevant art(s) based on the following discussion regarding flowchart 900.

Flowchart 900 begins with step 902. In step 902, one or more trending websites, rating websites, or informational websites are crawled to identify an item of media content. For example, and with reference to FIG. 8, media content identifier 810 may cause web crawler 116 to crawl one or more of websites 802A-802N to identify an item of media content. For example, media content identifier 810 may cause web crawler 116 to crawl "Twitter®" (i.e., website 802A) to identify that "Game of Thrones Season 8, Episode 1" is a popular item of media content that is being discussed.

In step 904, it is determined if the item of media content comprises new media content. This may be performed in various ways. For instance, and with reference to FIG. 8, media content catalog enhancer 112 may determine that an item of media content identified by media content identifier 810 is new media content by determining that information about the item of media content is not already stored in database 118. In another embodiment, media content catalog enhancer 112 may determine that an item of media content identified by media content identifier 810 comprises new media content based on additional information about the item of media content that is obtained at a corresponding website. For example, media content catalog enhancer 112 may determine that information about "Game of Thrones Season 8, Episode 1" is not stored in database 118 and thus determine that "Game of Thrones Season 8, Episode 1" comprises new media content. Alternatively, media content catalog enhancer 112 may determine that "Game of Thrones Season 8, Episode 1" is new media content based on information retrieved from "Twitter®" (e.g., website 802A), that indicates that "Game of Thrones Season 8, Episode 1" is premiering or is "New".

In step 906, steps 906A, and 906B are performed for each item of media content that is determined to include new media content. For example, if it is determined that "Game of Thrones Season 8, Episode 1" comprises new media content, steps 906A and 906B will be performed for that item of media content.

At step 906A, a source website associated with the new media content is crawled to obtain information about the new media content. For example, and with continued reference to FIG. 8, web crawler 116 crawls one of source websites 106A-106N that are associated with the new media content to obtain information about the new media content. This information may include, for example, a content ID that identifies the new media content and enables the new media content to be accessed at the corresponding source website or using the corresponding web service. For example, if source website 106A is an "HBO" website, then web crawler 116 will crawl source website 106A to obtain a content ID relating to "Game of Thrones Season 8, Episode 1." This content ID will be specific to "HBO" such that a when the content ID is passed to the "HBO" website or service, the "HBO" website or service will access "Game of Thrones Season 8, Episode 1" as the desired content.

At step 906B, the obtained information about the new media content is stored in a database. For example, and with continued reference to FIG. 8, the information obtained by web crawler 116 is stored in database 118. For example, the content ID relating to "Game of Thrones Season 8, Episode 1" will be stored in database 118.

III. Example Computer System Implementation

Various components of above-described media content search system may be implemented in hardware, or any combination of hardware with software and/or firmware. For example, various components of the above-described media content search system may be implemented as computer program code configured to be executed in one or more processors. In another example, various components of the above-described media content search system may be implemented as hardware (e.g., hardware logic/electrical circuitry), or any combination of hardware with software (computer program code configured to be executed in one or more processors or processing devices) and/or firmware.

Figure 10:
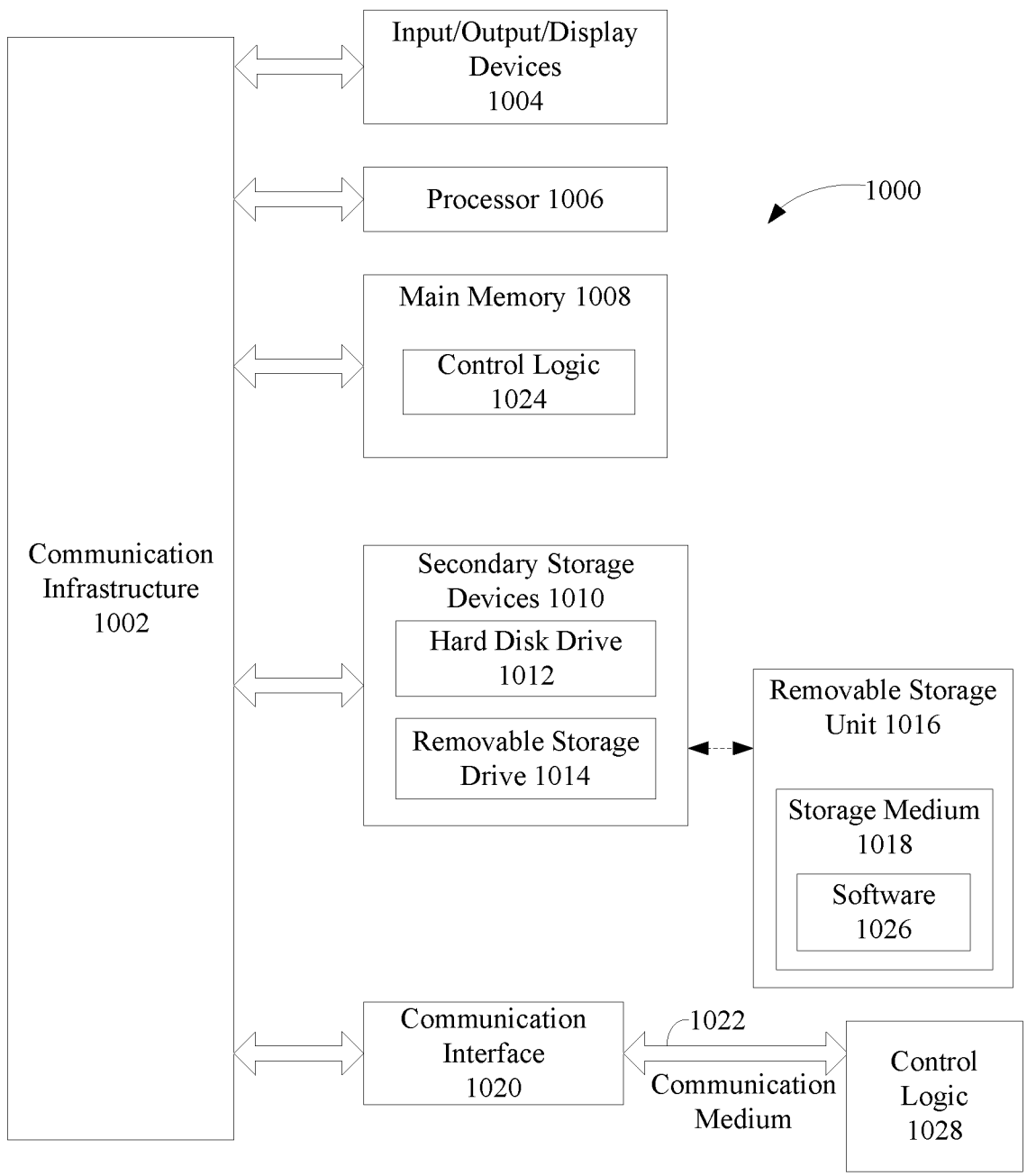
FIG. 10 is a block diagram of an example processor-based system that may be used to implement various embodiments described herein.

The embodiments described herein, including systems, methods/processes, and/or apparatuses, may be implemented using a processor-based computer system, such as system 1000 shown in FIG. 10. For example, various components of the above-described media content search system can each be implemented using one or more systems 1000.

System 1000 can be any commercially available and well known computer capable of performing the functions described herein, such as computers available from International Business Machines, Apple, Sun, HP, Dell, Cray, etc. System 1000 may be any type of computer, including a desktop computer, a server, etc.

As shown in FIG. 10, system 1000 includes one or more processors (also called central processing units, or CPUs), such as a processor 1006. Processor 1006 may be used to implement certain elements of the above-described media content search system; or any portion or combination thereof, for example, though the scope of the embodiments is not limited in this respect. Processor 1006 is connected to a communication infrastructure 1002, such as a communication bus. In some embodiments, processor 1006 can simultaneously operate multiple computing threads.

System 1000 also includes a primary or main memory 1008, such as random access memory (RAM). Main memory 1008 has stored therein control logic 1024 (computer software), and data.

System 1000 also includes one or more secondary storage devices 1010. Secondary storage devices 1010 may include, for example, a hard disk drive 1012 and/or a removable storage device or drive 1014, as well as other types of storage devices, such as memory cards and memory sticks. For instance, system 1000 may include an industry standard interface, such a universal serial bus (USB) interface for interfacing with devices such as a memory stick. Removable storage drive 1014 may represent a floppy disk drive, a magnetic tape drive, a compact disk drive, an optical storage device, tape backup, etc.

Removable storage drive 1014 may interact with a removable storage unit 1016. Removable storage unit 1016 includes a computer useable or readable storage medium 1018 having stored therein computer software 1026 (control logic) and/or data. Removable storage unit 1016 represents a floppy disk, magnetic tape, compact disc (CD), digital versatile disc (DVD), Blu-ray' disc, optical storage disk, memory stick, memory card, or any other computer data storage device. Removable storage drive 1014 reads from and/or writes to removable storage unit 1016 in a well-known manner.

System 1000 also includes input/output/display devices 1004, such as monitors, keyboards, pointing devices, etc.

System 1000 further includes a communication or network interface 1020. Communication interface 1020 enables system 1000 to communicate with remote devices. For example, communication interface 1020 allows system 1000 to communicate over communication networks or mediums 1022 (representing a form of a computer useable or readable medium), such as local area networks (LANs), wide area networks (WANs), the Internet, etc. Communication interface 1020 may interface with remote sites or networks via wired or wireless connections. Examples of communication interface 1022 include but are not limited to a modem, a network interface card (e.g., an Ethernet card), a communication port, a Personal Computer Memory Card International Association (PCMCIA) card, etc.

Control logic 1028 may be transmitted to and from system 1000 via the communication medium 1022.

Any apparatus or manufacture comprising a computer useable or readable medium having control logic (software) stored therein is referred to herein as a computer program product or program storage device. This includes, but is not limited to, system 1000, main memory 1008, secondary storage devices 1010, and removable storage unit 1016. Such computer program products, having control logic stored therein that, when executed by one or more data processing devices, cause such data processing devices to operate as described herein, represent embodiments of the invention.

Devices in which embodiments may be implemented may include storage, such as storage drives, memory devices, and further types of computer-readable media. Examples of such computer-readable storage media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nano-technology-based storage devices, as well as other media such as flash memory cards, digital video discs, RAM devices, ROM devices, and the like. Such computer-readable storage media may store program modules that include computer program logic for implementing the elements of the above-described media content search system and/or further embodiments described herein. Embodiments of the invention are directed to computer program products comprising such logic (e.g., in the form of program code, instructions, or software) stored on any computer useable medium. Such program code, when executed in one or more processors, causes a device to operate as described herein.

Note that such computer-readable storage media are distinguished from and non-overlapping with communication media. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

It is noted that while FIG. 10 shows a server/computer, persons skilled in the relevant art(s) would understand that embodiments/features described herein could also be implemented using other well-known processor-based computing devices, including but not limited to, smart phones, tablet computers, netbooks, gaming consoles, personal media players, and the like.

IV. Additional Example Embodiments

A system is described herein. The system includes one or more processors; and one or more memory devices connected to the one or more processors, the one or more memory devices storing computer program logic for execution by the one or more processors, the computer program logic including: an electronic program guide (EPG) data receiver configured to receive EPG data from an EPG data provider; and a media content catalog enhancer that is configured to determine that an item of media content identified by the EPG data comprises new media content and in response to determining that the item of media content identified by the EPG data comprises new media content, to cause a web crawler to crawl a source website associated with the new media content to obtain information about the new media content, and to store the obtained information about the new media content in a database, the database comprising a catalog of media content that is searchable by an end user to identify and access content for playback via an end user device.

In one embodiment of the foregoing system, the media content catalog enhancer is configured to determine that the item of media content identified by the EPG data comprises new media content by: determining that information about the item of media content is not already stored in the database.

In another embodiment of the foregoing system, the media content catalog enhancer is configured to determine that the item of media content identified by the EPG data comprises new media content by: determining that the item of media content is being aired for the first time as specified by the EPG data.

In another embodiment of the foregoing system, the media content catalog enhancer is configured to determine that the item of media content identified by the EPG data comprises new media content by: determining that the item of media content is being aired for the first time as specified by the EPG data; and determining that information about the item of media content is not already stored in the database.

In another embodiment of the foregoing system, the media content catalog enhancer is configured to cause the web crawler to crawl the source website associated with the new media content to obtain the information about the new media content by: scheduling the crawling of the source website to be performed at a time identified by the EPG data.

In another embodiment of the foregoing system, the database is populated by obtaining information about items of media content from one or more of: entertainment content metadata provider(s); video content provider(s); web-based information provider(s); audio content provider(s); recorded content; and network-based content.

In another embodiment of the foregoing system, the source website associated with the new media content comprises one of: an over-the-top (OTT) media services provider website; or an online digital media store.

In another embodiment of the foregoing system, the system further comprises a personalized searcher that is configured to: apply a search query received from the end user device to the database to identify items of media content that are responsive to the search query; and filter or rank the items of media content that are responsive to the search query based on one or more of: whether the end user possesses a subscription to a service associated with each item of media content that is responsive to the search query; a measure of popularity of each item of media content that is responsive to the search query; whether each item of media content that is responsive to the search query is currently available on live television; user preferences associated with one or more of the items of media content that are responsive to the search query; whether each item of media content that is responsive to the search query is related to a recently-watched item of media content; and whether each item of media content that is responsive to the search query is determined to be of interest to one or more other end users that are related to the end user; and provide information about the filtered or ranked items of media content to the end user device for presentation to the end user.

A computer-implemented method is described herein. The method comprises receiving electronic program guide (EPG) data from an EPG data provider; determining that an item of media content identified by the EPG data comprises new media content; in response to determining that the item of media content identified by the EPG data comprises new media content: crawling a source website associated with the new media content to obtain information about the new media content; and storing the obtained information about the new media content in a database, the database comprising a catalog of media content that is searchable by an end user to identify and access content for playback via an end user device.

In one embodiment of the foregoing computer-implemented method, determining that the item of media content identified by the EPG data comprises new media content comprises: determining that information about the item of media content is not already stored in the database.

In another embodiment of the foregoing computer-implemented method, determining that the item of media content identified by the EPG data comprises new media content comprises: determining that the item of media content is being aired for the first time as specified by the EPG data.

In another embodiment of the foregoing computer-implemented method, determining that the item of media content identified by the EPG data comprises new media content comprises: determining that the item of media content is being aired for the first time as specified by the EPG data; and determining that information about the item of media content is not already stored in the database.

In another embodiment of the foregoing computer-implemented method, crawling the source website associated with the new media content to obtain the information about the new media content comprises: scheduling the crawling of the source website to be performed at a time identified in the EPG data.

In another embodiment of the foregoing computer-implemented method, the database is populated by obtaining information about items of media content from one or more of: entertainment content metadata provider(s); video content provider(s); web-based information provider(s); audio content provider(s); recorded content; and network-based content.

In another embodiment of the foregoing computer-implemented method, the source website associated with the new media content comprises one of: an over-the-top (OTT) media services provider website; or an online digital media store.

In another embodiment of the foregoing computer-implemented method, the method further comprises applying a search query received from the end user device to the database to identify items of media content that are responsive to the search query; filtering or ranking the items of media content that are responsive to the search query based on one or more of: whether the end user possesses a subscription to a service associated with each item of media content that is responsive to the search query; a measure of popularity of each item of media content that is responsive to the search query; whether each item of media content that is responsive to the search query is currently available on live television; user preferences associated with one or more of the items of media content that are responsive to the search query; whether each item of media content that is responsive to the search query is related to a recently-watched item of media content; and whether each item of media content that is responsive to the search query is determined to be of interest to one or more other end users that are related to the end user; and providing information about the filtered or ranked items of media content to the end user device for presentation to the end user.

A computer-implemented method is described herein. The method comprises crawling one or more trending websites, rating websites, or informational websites to identify an item of media content; determining that the item of media content comprises new media content; in response to determining that the item of media comprises new media content: crawling a source website associated with the new media content to obtain information about the new media content; and storing the obtained information about the new media content in a database, the database comprising a catalog of media content that is searchable by an end user to identify and access content for playback via an end user device.

In another embodiment of the foregoing computer-implemented method, determining that the item of media content comprises new media content comprises: determining that information about the item of media content is not already stored in the database.

In another embodiment of the foregoing computer-implemented method, the database is populated by obtaining information about items of media content from one or more of: entertainment content metadata provider(s); video content provider(s); web-based information provider(s); audio content provider(s); recorded content; and network-based content.

In another embodiment of the foregoing computer-implemented method, the source website associated with the new media content comprises one of: an over-the-top (OTT) media services provider website; or an online digital media store.

IV. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A system for facilitating access to media content, comprising:
   a device having one or more processors, an interface for accessing the Internet, and one or more memory devices connected to the one or more processors, wherein the device is configured to:
      web crawl a first set of websites to identify a first item of media content, wherein the first set of websites comprises one or more of a trending website, a rating website or an informational website;
      determine that the first item of media content is new media content;
      in response to determining that the first item of media content is new media content, web crawl a second set of websites that is non-overlapping with the first set of websites and that comprises a content provider website associated with the first item of media content to obtain at least two additional pieces of information related to the first item of media content selected from the group consisting of:
a channel to display the first item of media content;
an air time of the first item of media content; and
a genre for the first item of media content; and
store an identifier of the first item of media content and the at least two additional pieces of information related to the first item of media content in at least one database comprising a catalog of media content from different media content providers that is searchable by an end user to identify and access content for playback.

2. The system of claim 1, wherein the different media content providers comprise at least one of:
an entertainment content metadata provider;
a video content provider;
a web-based information provider; or
an audio content provider.

3. The system of claim 1, wherein the device is further configured to:
enable a user to input a search query to identify the first item of media content for playback.

4. The system of claim 3, wherein the search query specifies the genre for the first item of media content.

5. The system of claim 1, wherein the device is further configured to:
enable a user to select the first item of media content.

6. The system of claim 5, wherein the device is further configured to:
provide the identification of the first item of media content to a media content provider of the different media content providers that provides the first item of media content responsive to the user selecting the first item of media content.

7. A method for facilitating access to media content performed by a device having one or more processors, an interface for accessing the Internet, and one or more memory devices connected to the one or more processors, the method comprising:
web crawling a first set of websites to identify a first item of media content wherein the first set of websites comprises one or more of a trending website, a rating website or an informational website;
determining that the first item of media content is new media content;
in response to determining that the first item of media content is new media content, web crawling a second set of websites that is non-overlapping with the first set of websites and that comprises a content provider website associated with the first item of media content to obtain at least two additional pieces of information related to the first item of media content selected from the group consisting of:
a channel to display the first item of media content;
an air time of the first item of media content; and
a genre for the first item of media content; and
storing an identifier of the first item of media content and the at least two additional pieces of information related to the first item of media content in at least one database comprising a catalog of media content from different media content providers that is searchable by an end user to identify and access content for playback.

8. The method of claim 7, wherein the different media content providers comprise at least one of:
an entertainment content metadata provider;
a video content provider;
a web-based information provider; or
an audio content provider.

9. The method of claim 7, further comprising:
enabling a user to input a search query to identify the first item of media content for playback.

10. The method of claim 9, wherein the search query specifies the genre for the first item of media content.

11. The method of claim 7, further comprising:
enabling a user to select the first item of media content.

12. The method of claim 11, further comprising:
providing the identification of the first item of media content to a media content provider of the different media content providers that provides the first item of media content responsive to the user selecting the first item of media content.

13. A non-transitory computer-readable storage medium having program instructions recorded thereon that, when executed by at least one processing circuit of a device having an interface for accessing the Internet, and one or more memory devices connected to the at least one processing circuit, perform a method, the method comprising:
web crawling a first set of websites to identify a first item of media content wherein the first set of websites comprises one or more of a trending website, a rating website or an informational website;
determining that the first item of media content is new media content;
in response to determining that the first item of media content is new media content, web crawling a second set of websites that is non-overlapping with the first set of websites and that comprises a content provider website associated with the first item of media content to obtain at least two additional pieces of information related to the first item of media content selected from the group consisting of:
a channel to display the first item of media content;
an air time of the first item of media content; and
a genre for the first item of media content; and
storing an identifier of the first item of media content and the at least two additional pieces of information related to the first item of media content in at least one database comprising a catalog of media content from different media content providers that is searchable by an end user to identify and access content for playback.

14. The non-transitory computer-readable storage medium of claim 13, wherein the different media content providers comprise at least one of:
an entertainment content metadata provider;
a video content provider;
a web-based information provider; or
an audio content provider.

15. The non-transitory computer-readable storage medium of claim 13, wherein the method further comprises:
enabling a user to input a search query to identify the first item of media content for playback.

16. The non-transitory computer-readable storage medium of claim 15, wherein the search query specifies the genre for the first item of media content.

17. The non-transitory computer-readable storage medium of claim 13, further comprising:
enabling a user to select the first item of media content.

18. The system of claim 1, wherein the device is configured to determine that the first item of media content is new media content by comparing information about the first item of media content to information about media content already stored in the at least one database.

19. The method of claim 7, wherein determining that the first item of media content is new media content comprises comparing information about the first item of media content to information about media content already stored in the database.

20. The non-transitory computer-readable storage medium of claim 13, wherein determining that the first item of media content is new media content comprises comparing information about the first item of media content to information about media content already stored in the database.

* * * * *

UNITED STATES PATENT AND TRADEMARK OFFICE
CERTIFICATE OF CORRECTION

PATENT NO. : 11,977,592 B2
APPLICATION NO. : 17/840883
DATED : May 7, 2024
INVENTOR(S) : Singh et al.

Page 1 of 1

It is certified that error appears in the above-identified patent and that said Letters Patent is hereby corrected as shown below:

In the Claims

In Column 22, Claim 15, Line 61, delete "playback." and insert -- playback by the device. --, therefor.

Signed and Sealed this
Twenty-third Day of July, 2024

Katherine Kelly Vidal
*Director of the United States Patent and Trademark Office*